(12) United States Patent
Eickhoff

(10) Patent No.: US 11,800,066 B1
(45) Date of Patent: Oct. 24, 2023

(54) UNMANNED AERIAL VEHICLE WITH TUNABLE VIDEO LATENCY AND VIDEO PLAYBACK

(71) Applicant: Sentera, Inc., Minneapolis, MN (US)

(72) Inventor: Brian Eickhoff, Minneapolis, MN (US)

(73) Assignee: Sentera, Inc., St. Paul, MN (US)

( * ) Notice: Subject to any disclaimer, the term of this patent is extended or adjusted under 35 U.S.C. 154(b) by 644 days.

(21) Appl. No.: 16/537,765

(22) Filed: Aug. 12, 2019

(51) Int. Cl.
| | |
|---|---|
| *H04N 7/18* | (2006.01) |
| *B64C 39/02* | (2023.01) |
| *B64D 47/08* | (2006.01) |
| *G05D 1/00* | (2006.01) |
| *H04B 7/185* | (2006.01) |
| *H04N 5/265* | (2006.01) |
| *H04N 5/91* | (2006.01) |
| *H04N 7/08* | (2006.01) |
| *B64U 101/30* | (2023.01) |
| *B64U 10/13* | (2023.01) |

(52) U.S. Cl.
CPC .............. *H04N 7/185* (2013.01); *B64C 39/02* (2013.01); *B64D 47/08* (2013.01); *G05D 1/0038* (2013.01); *H04B 7/18517* (2013.01); *H04N 5/265* (2013.01); *H04N 5/91* (2013.01); *H04N 7/0806* (2013.01); *B64U 10/13* (2023.01); *B64U 2101/30* (2023.01); *B64U 2201/10* (2023.01)

(58) Field of Classification Search
CPC ......... H04N 7/185; B64C 39/02; B64D 47/08; G05D 1/0038; H04B 7/18517; H04N 5/265; H04N 5/91; H04N 7/0806; B64C 2201/027; B64C 2201/127; B64C 2201/141; B64U 10/13; B64U 2101/30; B64U 2201/10
USPC ....................................................... 348/144
See application file for complete search history.

(56) References Cited

U.S. PATENT DOCUMENTS

| | | | | |
|---|---|---|---|---|
| 8,379,083 | B1* | 2/2013 | Jafari et al. ............ | H04L 47/34 348/125 |
| 2009/0201805 | A1* | 8/2009 | Begen et al. ........ | H04L 1/0009 370/225 |
| 2018/0091217 | A1* | 3/2018 | Christomanos ...... | H04N 19/115 |

* cited by examiner

*Primary Examiner* — Matthew K Kwan
(74) *Attorney, Agent, or Firm* — Hamre, Schumann, Mueller & Larson, P.C.

(57) ABSTRACT

Systems and methods are described where a ground control station in communication with a UAV can render a low latency (but possibly lossy), essentially real-time video captured by the UAV, or render a substantially lossless, reconstructed version of the video stream, depending upon a video latency period selected by a user. The user is able to select the desired video latency period, for example via the ground control station, and can change the video latency period as desired including in real-time as the UAV is in flight and capturing video.

5 Claims, 3 Drawing Sheets

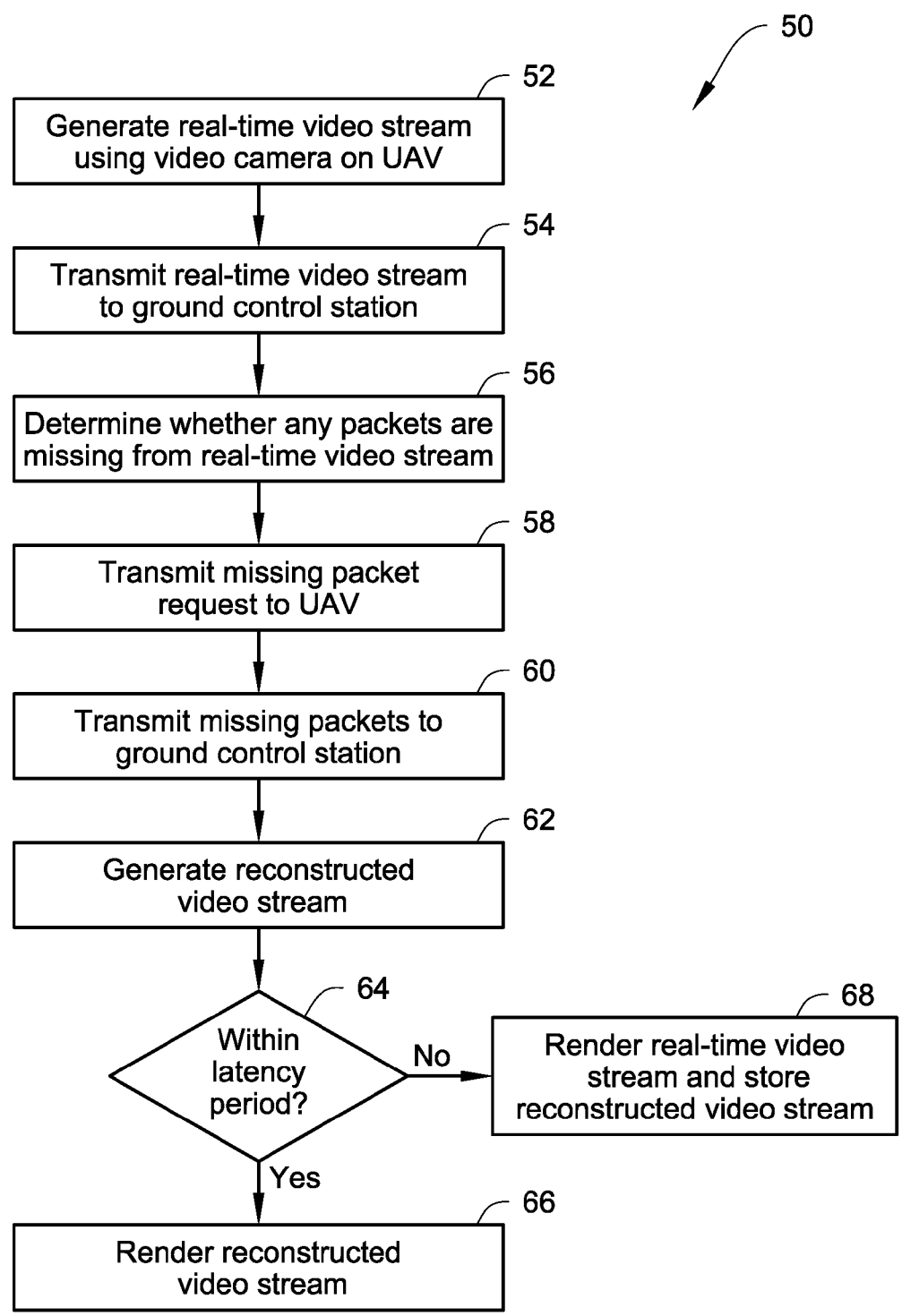

UNMANNED AERIAL VEHICLE WITH TUNABLE VIDEO LATENCY AND VIDEO PLAYBACK

FIELD

Figure 1:
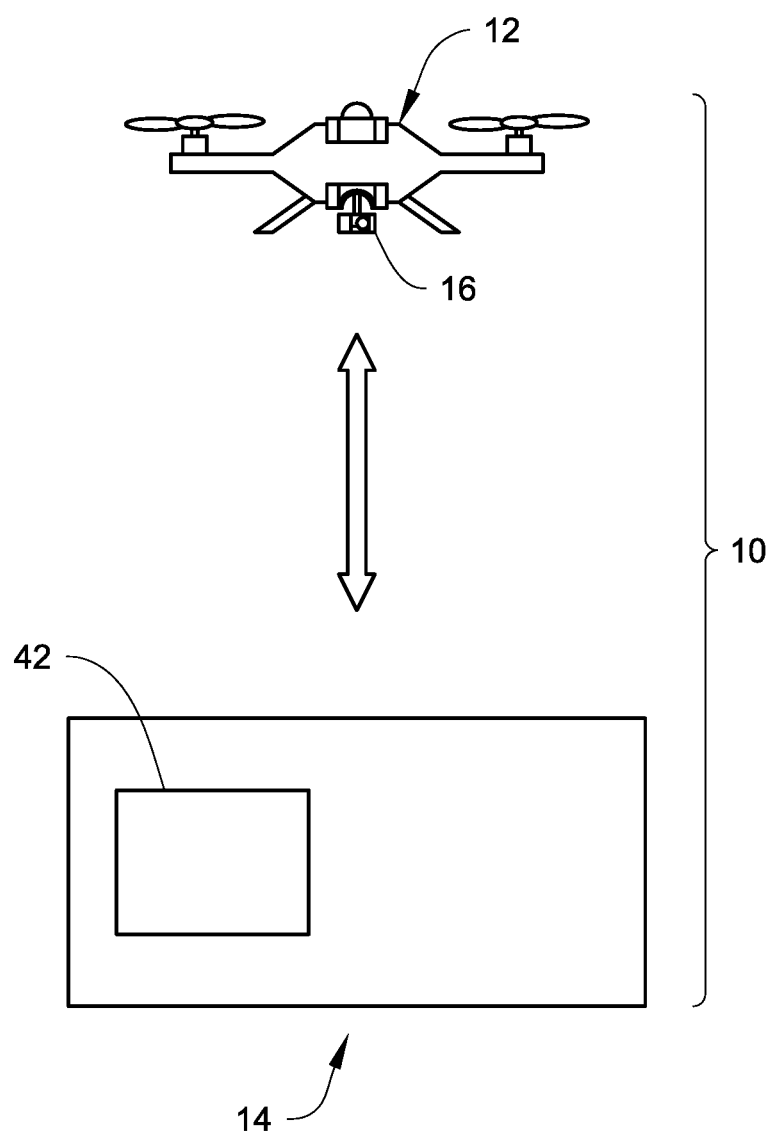

This disclosure relates to transmitting video from an unmanned aerial vehicle (UAV) to a ground control station.

BACKGROUND

There is an increasing use of UAVs in precision agriculture in an effort to improve farming management through the use of video or images captured by the UAV. In the case of video, the video can be stored on the UAV which is then accessed when the UAV lands for viewing and analysis of the video. In some applications, low or no latency video feeds are desirable in order to permit substantially real-time viewing of the video being captured by the UAV as the UAV is in flight.

SUMMARY

Systems and methods are described where a ground control station in communication with a UAV can render a low latency (but possibly lossy), real-time video captured by the UAV, or render a substantially lossless, reconstructed version of the video stream, depending upon a video latency period selected by a user. If the ground control station determines that packets are missing from the video stream received from the UAV, and the ground control station thereafter receives the missing packets from the UAV within the selected video latency period, the ground control station can render the reconstructed, substantially lossless video stream. Alternatively, if the ground control station receives the missing packets from the UAV outside of the selected video latency period, the ground control station can render the received real-time (but possibly lossy) video stream, and the ground control station stores the reconstructed, substantially lossless video stream for later rendering.

The user is able to select the desired video latency period, for example via the ground control station, and can change the video latency period as desired including in real-time as the UAV is in flight and capturing video. One benefit of being able to select or change the latency period is to react to dynamically changing network reliability. For example, when approaching the fringe of a wireless communication range, there may be an unacceptable amount of packet loss for the lowest latency video rendering. However, by relaxing the latency requirement a more useful quality of video may be achieved by waiting for the arrival of lost packets before rendering the video.

In one embodiment, to guard against data theft, for example if the UAV crashes or is inappropriately accessed, the UAV does not permanently store the real-time video stream generated by the video camera in permanent storage.

In one embodiment described herein, a method of transmitting video from a UAV to a ground control station can include generating a real-time video stream using a video camera on the unmanned aerial vehicle. The real-time video stream is transmitted from the UAV to the ground control station. The ground control station then determines whether any packets are missing from the real-time video stream received from the UAV. If packets are missing, the ground control station transmits a missing packet request to the UAV which identifies and requests the missing packets. The UAV then transmits the missing packets to the ground control station based on the missing packet request. The ground control station then generates a reconstructed video stream from the received real-time video stream and from the missing packets. If the ground control station receives the missing packets and can generate the reconstructed video stream within a selected video latency period, the ground control station renders the reconstructed video stream. Otherwise, if the ground control station receives the missing packets and/or generates the reconstructed video stream outside of the selected video latency period, the ground control station initially renders the received real-time video stream, and the ground control station stores the reconstructed video stream for later playback.

If necessary, the missing packets may be requested by the ground control station or transmitted by the UAV a plurality of times. The need for multiple missing packet requests or multiple missing packet transmissions may occur when the initial missing packet request is lost, or if some or all of the retransmitted missing packets are lost.

In another embodiment described herein, a UAV system is described that can implement the methods described herein. For example, a UAV system described herein can include a video camera that generates a real-time video stream, and a transceiver that can transmit the real-time video stream. The UAV system can also include a ground control station having a transceiver that can receive the real-time video stream, a missing packet detector that can detect packets missing from the real-time video stream, a video rendering system that can render a real-time (but possibly lossy) video stream or render a reconstructed, lossless or substantially lossless, video stream, a user latency selector that allows a user to select a video latency period, and a video stream reconstructor that can generate the reconstructed video stream from the real-time video stream and from missing data packets received from the UAV separately from the real-time video stream.

DRAWINGS

FIG. 1 schematically depicts a UAV system described herein.

Figure 2:
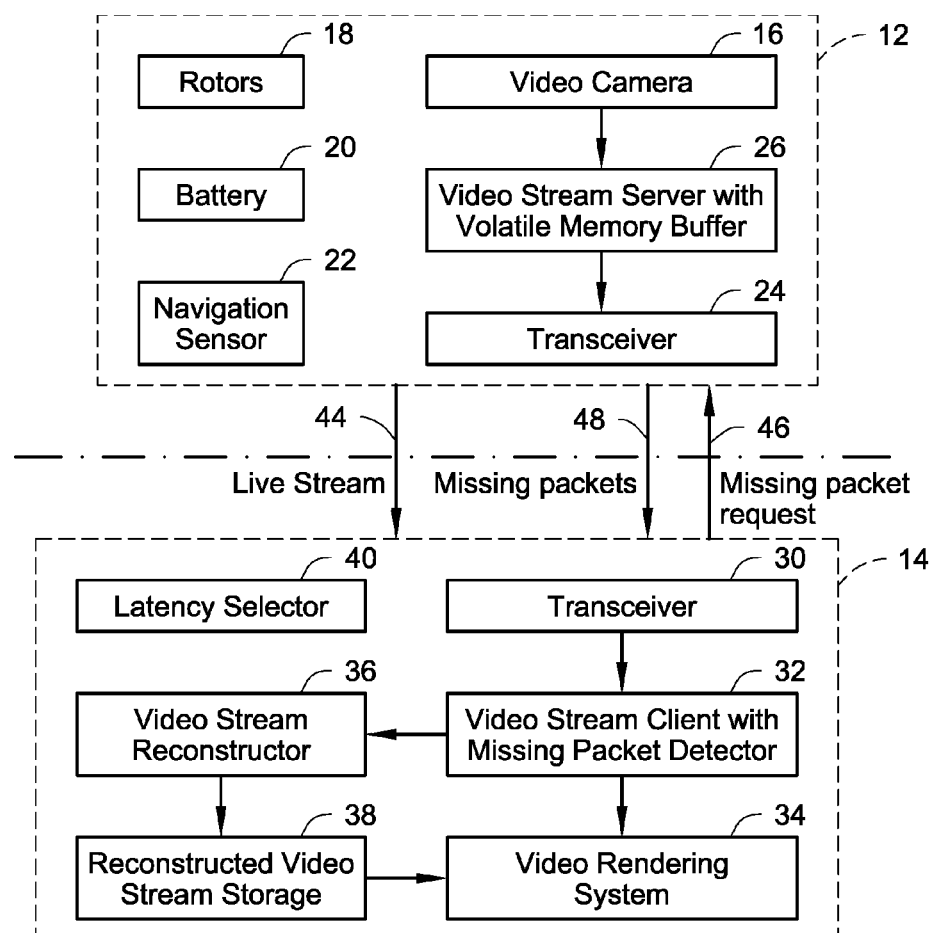

FIG. 2 is another schematic depiction of the UAV system described herein.

FIG. 3 schematically depicts one embodiment of a method described herein.

DETAILED DESCRIPTION

Referring to FIG. 1, a UAV system 10 is illustrated as including a UAV 12 and a ground control station 14. One non-limiting example application of the UAV system 10 is in precision agriculture where the UAV 12 is used to generate video (and optionally still images and/or other data) of an agricultural field, for example to analyze the soil in the field, analyze plants growing in the field, and the like. For purposes of the systems and method described herein, the UAV 12 preferably includes a video camera 16 that can be a gimballed or fixed position video camera.

The UAV 12 and the ground control station 14 are in wireless communication with one another using any known conventional wireless communication technique(s). The UAV 12 can transmit various data to the ground control station 14. The data can be from one or more sensors known in the art that sense external variables, for example one or more video cameras, one or more still cameras, one or more incident light sensors, one or more air temperature sensors, and the like. The data transmitted by the UAV 12 may also be from sensors that sense variables relating to the operation of the UAV 12, such as navigation sensor data, battery level data and the like.

The ground control station 14 can also transmit commands to the UAV 12. The commands can be, for example, navigational/directional commands, commands to turn on/ off various sensors, a missing packet request (described further below), and other commands.

In one non-limiting embodiment, the UAV 12 can be a quad-copter or quad-rotor UAV. However, the UAV 12 may alternatively include other types of UAVs including, but not limited to, other type of rotorcraft UAV, a fixed-wing UAV, or another type of UAV.

Referring to FIGS. 1 and 2, the UAV 12 can include the video camera 16, one or more rotors 18, one or more batteries 20, a navigation sensor 22, and a transceiver 24. The video camera 16 can be a conventional video camera known in the art for capturing video of an intended target area. The rotor(s) 18 rotates to provide the lift and propulsion for the UAV 12. The battery 20, which may be rechargeable, provides stored electrical energy for powering the various electrical components of the UAV 12. The navigation sensor 22 may include an inertial measurement unit (IMU), which may include an accelerometer and gyroscope to output UAV 12 roll, pitch, yaw, acceleration, or approximate velocity calculated based on acceleration. The navigation sensor 22 may include a compass to provide heading or a global navigation satellite system (GNSS), such as the Global Positioning System (GPS) to provide location. In an example, the navigation sensor 22 may include a tightly coupled IMU and GNSS system, where the IMU data is used to reduce noise in the GNSS positioning accuracy and the GNSS data is used to reduce inertial positioning noise (e.g., drift). The transceiver 24 can be any conventional transceiver known in the art for wirelessly transmitting and receiving data/commands. The video camera 16, the one or more rotors 18, the one or more batteries 20, the navigation sensor 22, and the transceiver 24 are each well known in the art.

With continued reference to FIGS. 1-2, the UAV 12 further includes a video stream server 26 having a volatile memory buffer. The video stream server 26 receives a real-time video stream directly or indirectly from the video camera 16 and prepares the real-time video stream for streaming transmission to the ground control station 14 via the transceiver 24.

With continued reference to FIGS. 1-2, the ground control station 14 can include a transceiver 30, a video stream client 32 with a missing packet detector, a video rendering system 34, a video stream reconstructor 36, a reconstructed video storage 38, and a latency selector 40. Other elements can also be included on the ground control station 14 such as one or more user inputs which can be, for example, input buttons or inputs on a touchscreen which can be separate from, or incorporated into, a display screen 42 (see FIG. 1) of the video rendering system 34. The display screen 42 can have any construction suitable for displaying a video stream.

The transceiver 30 can be any conventional transceiver known in the art for wirelessly transmitting and receiving data/commands including receiving the real-time video stream 44 from the UAV 12, transmitting the missing packet request described herein, and receiving the missing packets from the UAV 12.

The video stream client 32 receives the real-time video stream 44, and the missing packet detector determines whether any packets are missing from the real-time video stream 44. The techniques for determining whether packets are missing from the video stream 44 are well known in the art. If no packets are missing, the real-time video stream 44 can immediately be rendered via the video rendering system 34 for viewing the real-time video stream 44 on the display screen 42.

If the missing packet detector determines that one or more packets are missing from the real-time video stream 44, a missing packet request 46 is generated, for example by the video stream client 32 or by another element of the ground control station 14, and transmitted to the UAV 12. The missing packet request 46 identifies the missing packets and requests that the UAV 12 send the missing packets to the ground control station 14. The missing packets that are available in the memory buffer of the video stream server 26 are then transmitted 48 to the ground control station 14. As used herein, the term "missing" is intended to include packets that are absent from the real-time video stream 44 received from the UAV 12, as well as packets that are present in the real-time video stream 44 but which may be or are corrupted. The packets can be missing for any reason. For example, the missing packets can be unintentionally lost or corrupted in the transmission of the real-time video stream 44 to the ground control station 14.

The missing packets received by the ground control station 14 are then provided to the video stream reconstructor 36 along with the real-time video stream 44. The video stream reconstructor 36 generates a reconstructed video stream by combining the real-time video stream 44 and the missing packets 48. The reconstructed video stream is essentially identical to the original video stream generated by the video camera 16, and at the very least is closer to the original video stream than the real-time video stream 44 with lost packets received by the ground control station 14. The reconstructed video stream can then be stored in the reconstructed video stream storage 38. As discussed further below, the reconstructed video stream may also be rendered on the display screen 42 of the video rendering system 34.

The latency selector 40 permits the user to select a desired latency associated with rendering or viewing the video stream generated by the video camera 16 of the UAV 12. In some embodiments, it is important to be able to view the video in real-time essentially immediately after it is captured by the video camera 16 so the user is seeing what the video camera 16 sees as the video camera 16 sees it. In these embodiments, low or no latency viewing is required. In other embodiments, it may be acceptable to view the real-time video some period of time after it is captured by the video camera 16, i.e. there is a time delay between when the video camera 16 sees something and when the video is rendered to the user for viewing. In these embodiments, a longer latency is acceptable. In some embodiments, the user may want to switch from low or no latency viewing to longer latency viewing (and vice versa) while the UAV 12 is in flight and capturing video.

The latency selector 40 permits the user to select the desired latency. As a result, the latency can be referred to be as being tunable. The latency selector 40 can be, for example, one or more input buttons on or associated with the ground control station 14 or inputs on a touchscreen which can be separate from, or incorporated into, the display screen 42. The selection of the desired latency can occur prior to launch of the UAV 12 (i.e. while the UAV 12 is on the ground) or while the UAV 12 is in flight. The latency can also be changed from one selected latency to a second selected latency while the UAV 12 is in flight. In some embodiments, a latency selector can also be provided directly on the UAV 12 to allow user selection of a desired latency via the UAV 12 while the UAV 12 is on the ground.

The latency determines which video will be rendered by the video rendering system 34. If the ground control station 14 receives the missing packets 48 and can generate the reconstructed video stream within the selected video latency period, the ground control station 14 will render the reconstructed video stream via the video rendering system 34. Otherwise, if the ground control station 14 receives the missing packets 48 and/or generates the reconstructed video stream outside of the selected video latency period, the ground control station 14 will initially render the real-time (and possibly lossy) video stream 44 via the video rendering system 34, and the reconstructed video stream will be stored in the storage 38 for possible later lossless or substantially lossless playback of the reconstructed video stream. If the real-time video stream 44 is not missing any packets, then the real-time video stream 44 can be immediately rendered via the video rendering system 34.

Referring to FIG. 3 together with FIGS. 1 and 2, one embodiment of a video transmission method 50 will now be described. At box 52, a real-time video stream is generated using the video camera 16 on the UAV 12. At box 54, the real-time video stream 44 is transmitted from the UAV 12 to the ground control station 14. At box 56, the ground control station 14, for example via the video stream client 32 and the missing packet detector, determines whether any packets are missing from the real-time video stream 44. If no packets are missing, the real-time video stream 44 can be immediately rendered by the video rendering system 34 of the ground control station 14. If one or more packets are missing, then at box 58 a missing packet request 46 is generated and transmitted to the UAV 12 identifying the missing packets and requesting that the UAV transmit the missing packets. At box 60, any of the missing packets 48 still in memory on the UAV 12 are transmitted to the ground control station 14. At box 62, the video stream reconstructor 36 then generates a reconstructed video stream by combining the real-time video stream 44 and the missing packets 44.

At decision box 64, it is determined if the selected video latency period still applies. For example, if the ground control station 14 receives the missing packets 48 and can generate the reconstructed video stream within the selected video latency period (i.e. the decision at decision box 64 is yes), at box 66 the ground control station 14 will render the reconstructed video stream via the video rendering system 34. If the ground control station 14 receives the missing packets 48 and/or generates the reconstructed video stream outside of the selected video latency period (i.e. the decision at decision box 64 is no), at box 68 the ground control station 14 will initially render the real-time (and possibly lossy) video stream 44 via the video rendering system 34, and the reconstructed video stream will be stored in the storage 38 for possible later lossless or substantially lossless playback of the reconstructed video stream.

In some embodiments, to guard against data theft, for example if the UAV crashes or is inappropriately accessed, the UAV does not store any of the video generated by the video camera 16 in permanent storage. However, if security relating to the video generated by the video camera 16 is not a concern, then the video stream may be stored in permanent storage on the UAV 12.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A method of transmitting video from an unmanned aerial vehicle to a ground control station, comprising:
   generating a real-time video stream using a video camera on the unmanned aerial vehicle;
   transmitting the real-time video stream from the unmanned aerial vehicle to the ground control station;
   the ground control station determining whether any packets are missing from the real-time video stream received from the unmanned aerial vehicle;
   transmitting a missing packet request from the ground control station to the unmanned aerial vehicle, the missing packet request identifying packets missing from the real-time video stream;
   the unmanned aerial vehicle transmitting the missing packets to the ground control station based on the missing packet request;
   the ground control station generates a reconstructed video stream from the received real-time video stream and from the missing packets;
   if the ground control station receives the missing packets within a selected video latency period, the ground control station renders the reconstructed video stream;
   if the ground control station receives the missing packets outside of the selected video latency period, the ground control station renders the received real-time video stream, and the ground control station stores the reconstructed video stream;
   allowing a user to select the selected video latency period via the ground control station.

2. The method of claim 1, comprising allowing the user to change the selected video latency period via the ground control station as the unmanned aerial vehicle is in flight and while the ground control station is rendering the reconstructed video stream or rendering the received real-time video stream.

3. The method of claim 1, wherein the real-time video stream generated by the video camera is not stored in permanent storage on the unmanned aerial vehicle.

4. An unmanned aerial vehicle system, comprising:
   an unmanned aerial vehicle having a video camera that generates a real-time video stream, and a transceiver that can transmit the real-time video stream; and
   a ground control station having a transceiver that can receive the real-time video stream, a missing packet detector that can detect packets missing from the real-time video stream, a video rendering system, a user latency selector that allows a user to select a video latency period, and a video stream reconstructor that can generate a reconstructed video stream from the real-time video stream and from missing data packets received from the unmanned aerial vehicle separately from the real-time video stream.

5. The unmanned aerial vehicle system of claim 4, wherein the unmanned aerial vehicle does not have permanent storage in which the real-time video stream is stored.

* * * * *